(12) United States Patent
Mandelert et al.

(10) Patent No.: US 10,353,059 B2
(45) Date of Patent: Jul. 16, 2019

(54) SYSTEM FOR DETECTING AND LOCATING SUBMERGED OBJECTS HAVING NEUTRAL BUOYANCY SUCH AS MOORED MINES AND ASSOCIATED METHOD

(71) Applicant: THALES, Courbevoie (FR)

(72) Inventors: Nicolas Mandelert, Ploudalmezeau (FR); Pierre Guthmann, Brest (FR)

(73) Assignee: THALES, Courbevoie (FR)

( * ) Notice: Subject to any disclaimer, the term of this patent is extended or adjusted under 35 U.S.C. 154(b) by 392 days.

(21) Appl. No.: 15/021,636

(22) PCT Filed: Sep. 10, 2014

(86) PCT No.: PCT/EP2014/069256
§ 371 (c)(1),
(2) Date: Mar. 11, 2016

(87) PCT Pub. No.: WO2015/036417
PCT Pub. Date: Mar. 19, 2015

(65) Prior Publication Data
US 2016/0223659 A1    Aug. 4, 2016

(30) Foreign Application Priority Data

Sep. 13, 2013 (FR) ..................... 13 02141

(51) Int. Cl.
*G01S 7/539* (2006.01)
*G01S 7/62* (2006.01)
(Continued)

(52) U.S. Cl.
CPC ............... *G01S 7/539* (2013.01); *B63G 7/08* (2013.01); *G01S 7/6272* (2013.01);
(Continued)

(58) Field of Classification Search
CPC .......... G01S 7/539; G01S 15/42; G01S 15/89; G01S 7/62; G01S 7/6281; G01S 15/87;
(Continued)

(56) References Cited

U.S. PATENT DOCUMENTS 4,458,342 A * 7/1984 Tournois ................. G01S 15/89
342/157
4,493,064 A 1/1985 Odero et al.
(Continued)

FOREIGN PATENT DOCUMENTS

| DE | 32 19 487 A1 | 12/1983 |
|----|--------------|---------|
| EP | 1 887 383 A1 | 2/2008 |
| JP | 2-13877 A | 1/1990 |
| JP | 2012-051561 A | 3/2012 |
| JP | 2012-98102 A | 5/2012 |

*Primary Examiner* — Isam A Alsomiri
*Assistant Examiner* — Amie M Ndure
(74) *Attorney, Agent, or Firm* — Baker & Hostetler LLP

(57) ABSTRACT

A system for detecting and locating submerged underwater objects having neutral buoyancy comprising mechanically steered sonar to image the water column comprises mechanically steered sonar with a single emission channel, to perform the insonification of a first individual sector in a first pointing direction by a single first acoustic pulse, the sonar forming a single reception channel suitable for acquiring a first acoustic signal resulting from insonification, the mechanically steered sonar being mounted on a carrier to advance in a main direction, the first pointing direction substantially lateral to the carrier and the first individual sector exhibits a wide relative bearing aperture and a narrow elevation aperture, the mechanically steered sonar comprising a mechanical pointing device to tilt the first pointing direction about an axis of rotation substantially parallel to the main direction allowing the sonar to acquire first acoustic signals resulting from insonifications performed in different pointing directions.

22 Claims, 5 Drawing Sheets

(51) Int. Cl.
*G01S 15/42* (2006.01)
*G01S 15/87* (2006.01)
*G01S 15/88* (2006.01)
*G01S 15/89* (2006.01)
*G10K 11/35* (2006.01)
*B63G 7/08* (2006.01)
*B63G 7/00* (2006.01)

(52) U.S. Cl.
CPC ............ *G01S 7/6281* (2013.01); *G01S 15/42* (2013.01); *G01S 15/87* (2013.01); *G01S 15/88* (2013.01); *G01S 15/8902* (2013.01); *G01S 15/8904* (2013.01); *G10K 11/352* (2013.01); *G10K 11/355* (2013.01); *B63G 2007/005* (2013.01); *G01S 7/6263* (2013.01)

(58) Field of Classification Search
CPC .... G01S 15/88; G01S 15/8904; G01S 7/6272; G01S 15/8902; G01S 7/6263; G10K 11/35; G10K 11/355; G10K 11/352; B63G 7/08; B63G 2007/005
See application file for complete search history.

(56) References Cited

U.S. PATENT DOCUMENTS

| | | | |
|---|---|---|---|
| 4,951,268 A | 8/1990 | Grall | |
| 5,412,618 A * | 5/1995 | Gilmour | G01S 15/8904 367/104 |
| 5,506,812 A | 4/1996 | Zehner | |
| 5,537,380 A * | 7/1996 | Sprankle, Jr. | G01S 7/6245 367/105 |
| 5,946,272 A | 8/1999 | McDonald et al. | |
| 6,377,514 B1 * | 4/2002 | Linnenbrink | G01H 3/125 367/11 |
| 7,688,675 B2 * | 3/2010 | Chambers | G01S 15/96 367/88 |
| 9,090,315 B1 * | 7/2015 | Stone | G02B 6/3604 |
| 2006/0280030 A1 * | 12/2006 | Makris | G01S 7/52004 367/11 |
| 2009/0031940 A1 * | 2/2009 | Stone | B63C 11/42 114/330 |
| 2015/0256033 A1 * | 9/2015 | Stone | G02B 6/3604 307/9.1 |
| 2015/0294660 A1 * | 10/2015 | Stokes | G01S 15/96 367/173 |

* cited by examiner

SYSTEM FOR DETECTING AND LOCATING SUBMERGED OBJECTS HAVING NEUTRAL BUOYANCY SUCH AS MOORED MINES AND ASSOCIATED METHOD

CROSS-REFERENCE TO RELATED APPLICATIONS

This application is a National Stage of International patent application PCT/EP2014/069256, filed on Sep. 10, 2014, which claims priority to foreign French patent application No. FR 1302141, filed on Sep. 13, 2013, the disclosures of which are incorporated by reference in their entirety.

FIELD OF THE INVENTION

The invention disclosed herein relates to a system for detecting and locating underwater objects having neutral buoyancy, comprising a sonar making it possible to detect the underwater objects having returned sonar echoes, that is to say returned echoes following the emission of an acoustic pulse (or acoustic ping) by the sonar.

BACKGROUND

Moored mines are mines of neutral buoyancy being attached by a cable, called tether, to an anchor, called sinker, resting on the seabed. The sonars are mounted either on a surface ship, or on a fish towed by a surface ship or on a self-propelled underwater vehicle.

One of the problems in detecting objects having neutral buoyancy is being able to detect mines over a wide swath so as to monitor an area of the marine environment that is as wide as possible in a minimum time. Another problem is being able to locate the detected mines with a sufficiently great accuracy in the three dimensions of space. In other words, another problem is producing a system for detecting underwater objects that exhibits a sufficient locating accuracy in the three dimensions of space of the order of a few meters.

One existing solution consists in using front looking sonars which insonify the water column in front of the carrier and which form a plurality of contiguous directional beams in reception terms. One drawback with this solution is that, to cover a wide swath at right angles to the axis of the carrier and locate underwater targets having neutral buoyancy with a good accuracy in terms of relative bearing, arrays that are of large dimensions, are bulky and consume a lot of electrical energy are needed. This drawback is incompatible with the trend in mine warfare which is to distance man from the threat. Technical solutions are sought for mounting the sonars on autonomous carriers, on board which a limited energy is stored, rather than on ships of mine hunter type. Another drawback with front looking sonars is that they do not make it possible to locate the mines with a good accuracy in terms of elevation without an array that is directional in elevation and which therefore adds bulk and energy consumption.

Another solution is described in patent application U.S. Pat. No. 5,506,812; it consists in using cylindrical emission and reception arrays that make it possible to insonify a toroidal zone surrounding the carrier in a single acoustic ping, that is to say a single acoustic pulse. This solution presents the drawbacks of requiring a high emission power to transmit an acoustic pulse over 360° and of being very bulky since it uses an array with 120 reception channels.

Moreover, the processing of the multiple reception channels to detect objects in the water column and locate them can prove complex.

SUMMARY OF THE INVENTION

The aim of the invention is to remedy at least one of the abovementioned drawbacks.

To this end, the subject of the invention is a system for detecting and locating submerged underwater objects having neutral buoyancy, comprising at least one mechanically steered sonar with a single channel, the mechanically steered sonar being a sonar with a single emission channel making it possible to perform the insonification of a first individual sector in a first pointing direction by means of a single first pulse and forming a single reception channel suitable for acquiring a first acoustic signal resulting from said insonification, the mechanically steered sonar being mounted on a carrier intended to advance in a main direction, such that the first pointing direction is substantially lateral to the carrier and that the first individual sector exhibits a wide relative bearing aperture and a narrower elevation aperture, the scanning sonar comprising a pointing device intended to tilt the pointing direction about an axis of rotation substantially parallel to the main direction allowing the sonar to acquire first acoustic signals resulting from insonifications performed in different pointing directions. The system according to the invention advantageously comprises a processing unit configured to locate underwater objects having neutral buoyancy from first acoustic signals.

This system based on a mechanically steered sonar offers the advantage of being inexpensive, small and a low energy consumer compared to a multi-beam sonar (with a plurality of reception channels) which would require a powerful and bulky transmitter and a probably curved reception array with at least fifty or so channels. It also makes it possible, by configuring it shrewdly and by shrewd processing operations, to detect marine objects and locate them with a good accuracy in the three dimensions of space of the order of that obtained by means of a side-scan sonar for the detection of underwater objects placed on the seabed. It notably makes it possible to obtain position measurements exhibiting a good location accuracy in the three dimensions from a sonar having a poor horizontal resolution since it is a sonar with a single emission and reception channel exhibiting a poor resolution in relative bearing terms.

This system also makes it possible to detect short moored mines (situated at a low height relative to the seabed) which are difficult to detect with a side-scan sonar, particularly in proximity to the maximum observation range.

Advantageously, the system comprises a processing unit configured to locate underwater objects having neutral buoyancy from at least one first acoustic signal.

In a particular embodiment, the system comprises a plurality of mechanically steered sonars spaced apart in the main direction and the oriented pointing directions of which are directed toward the same side of a vertical plane passing through the main direction.

Advantageously, the system comprises at least one side-scan sonar intended to image the seabed in a second pointing direction in a second individual sector exhibiting a wide relative bearing aperture and a narrow elevation aperture, the side-scan sonar forming a plurality of relative bearing reception channels and being mounted on the carrier such that the second pointing direction is oriented substantially laterally to the carrier on the same side of the carrier, in relation to the vertical plane passing through the main direction, as the first pointing direction, the system further comprising a human-machine interface comprising a display device intended to simultaneously display a first sonar image representing first acoustic signals and a second sonar image representing second acoustic signals acquired during a same period of acquisition by the mechanically steered sonar and respectively by the side-scan sonar with the human-machine interface being configured such that, when the first and second images are displayed simultaneously, an operator can, when they visually identify, on the first image, a first echo created by a submerged object having neutral buoyancy, visually identify instantaneously, on the second image, if a second echo has been reflected by an object placed on the seabed substantially directly below the submerged object.

This feature allows an operator to classify the detected underwater objects and notably classify them according to whether they are moored mines or free objects having neutral buoyancy. In effect, both the mine and the sinker return intense echoes which are represented by bright zones on the sonar images. If, at the moment when a first bright echo is obtained by means of the scanning sonar, a second bright echo is also obtained by means of the side-scan sonar around the position of the first echo, there is a high probability that this second echo has been formed by a sinker and that the first echo has been formed by a moored mine. This allows an operator to confirm a detection of a moored mine in the volume. It is thus possible to distinguish moored mines from free objects such as shoals of fishes or mammals.

In a particular embodiment, the display device is configured such that the first image and the second image displayed have substantially identical sizes and such that an echo included in the first image and an echo included in the second image reflected by respective objects situated at a same distance from the mechanically steered sonar and respectively from the side-scan sonar and generated following a first and a second simultaneous insonification step are represented substantially at a same abscissa and at a same ordinate on the first image and on the second image.

In a preferred embodiment, the human-machine interface comprises tracking means allowing an operator to simultaneously move two cursors displayed by the display device, one on the first image and the other on the second image, the display device being configured such that the two cursors occupy, on the first and the second image, positions corresponding to a same geographic position in a terrestrial reference frame.

Advantageously, the cursor displayed on the first image is provided with a curve representing a set of the possible positions on the first image of echoes originating from an object having created an echo represented at the position pointed to by the cursor.

Advantageously, which the first image and the second image represent the first and second acoustic signals in instant mode of emission of the acoustic pulse originating the signals/distance separating, in the horizontal plane, the objects originating the echoes, and being included in said signals, from a fixed point in relation to said sonars.

Advantageously, the system comprises a processing unit suitable for identifying, in first signals, first effective echoes effectively created by effectively submerged effective objects having neutral buoyancy, the display device being configured so as to display, superimposed with the first image and/or the second image, symbols at the effective positions considered as being effectively occupied by the effective objects.

Advantageously, said human-machine interface comprises a classification unit configured so as to allow an operator to classify first echoes visible on the first image or first effective echoes identified, by a processing unit in first signals, as being created by effectively submerged effective objects having neutral buoyancy visible in a first class taken from a plurality of classes comprising a moored mine class and a free floating object class.

The invention relates also to a method for detecting and locating underwater objects having neutral buoyancy, using a system according to the invention, the method comprising a scanning step in which the mechanically steered sonar scans, a plurality of times, a sector to be imaged open in a plane substantially at right angles to the main direction, in which the mechanically steered sonar performs successive sonar acquisition steps in which the pointing device points the first pointing direction in successive pointed directions included in the sector to be imaged, and, for each pointed direction, transmits a first acoustic pulse at a first insonification instant and acquires a first acoustic signal resulting from the first acoustic pulse.

Advantageously, the method comprises a detection step for detecting first potential echoes created by submerged objects having neutral buoyancy by means of first signals, comprising unitary detection steps, each unitary detection step comprising an identification step for identifying first potential echoes, considered as having been created by respective potential floating objects in response to a first acoustic pulse, the first potential echoes being parts of first signals satisfying a predetermined selection criterion.

Advantageously, the identification step comprises a step of thresholding of the contrasts of first signals.

Advantageously, the mechanically steered sonar is configured, given the speed of the carrier, so as to acquire, in the scanning step, more than once, echoes from a one-off object fixed in the terrestrial reference frame and located at a depth lying between a predetermined minimum depth and a predetermined maximum depth, and located at right angles to the main direction in a horizontal plane, at a distance from the mechanically steered sonar greater than a predetermined minimum range and less than a predetermined maximum range, the method comprising a step of locating effective submerged objects having neutral buoyancy from the first acoustic signals acquired in the scanning step and from the first potential echoes.

Advantageously, the method comprises a step of locating submerged objects having neutral buoyancy, comprising:

a step of determination of potential positions of the potential floating objects comprising, for each first potential echo, a step of determination of a set of potential positions, that the corresponding potential object is likely to occupy, from the position of the sonar at the first instant of emission of the first acoustic pulse originating the first potential echo, an accumulation step in which positions that are fixed in the terrestrial reference frame are assigned respective probabilities of occupancy corresponding to probabilities of being actually occupied by an object, said respective probabilities of occupancy being initialized at the start of the accumulation step and incremented each time the respective fixed positions are determined as being potential positions in the step of determination of potential positions, a step of identification of effective positions effectively occupied by effective submerged objects having neutral buoyancy from fixed positions assigned a probability of occupancy above a predetermined threshold.

Advantageously, the set of potential positions of a potential object is a circular arc, of radius equal to the distance separating the potential object from the mechanically steered sonar computed from the difference between the first instant of emission and the instant of reception of the first potential echo created by the potential object, the center of which is the position of the sonar at the first instant of emission and the aperture of which is equal to the aperture of the first individual sector, the first individual sector corresponding to the sector in which is transmitted the portion of the main lobe of the first acoustic pulse attenuated to the maximum of 3 dB, or equal to the aperture of the first individual sector plus a predetermined tolerance aperture.

Advantageously, the method is implemented by means of a system according to the invention, comprising a step of imaging of the seabed concurrent with the scanning step, the step of imaging of the seabed consisting in imaging the seabed by means of the side-scan sonar by transmitting second successive acoustic pulses at second successive insonification instants, and by conducting the acquisition of the second successive acoustic signals deriving from the second successive pulses, the method further comprising a step of simultaneous display of a first image representing first acoustic signals and of a second image representing second acoustic signals acquired during a same period of acquisition by the mechanically steered sonar and respectively by the side-scan sonar.

Advantageously, the method comprises a step of classification, by an operator by means of a classification unit, of at least one first echo visible on the first image in a class taken from a plurality of classes comprising a moored mine class and a free floating object class.

The invention relates also to a system for detecting and locating submerged underwater objects having neutral buoyancy suitable for implementing the method according to the invention, comprising a processing unit configured so as to implement the step of identification of the first potential echoes.

Advantageously, the system comprises a positioning unit, such as an inertial navigation system, configured so as to determine the position of the carrier as a function of time, in which the processing unit is configured so as to implement the location step, the positioning unit or the processing unit being configured so as to determine the position of the mechanically steered sonar.

BRIEF DESCRIPTION OF THE DRAWINGS

Other features and advantages of the invention will become apparent on reading the following detailed description, given as a nonlimiting example and with reference to the attached drawings in which.

DETAILED DESCRIPTION

From one figure to another, the same elements are identified by the same references.

Figure 1:
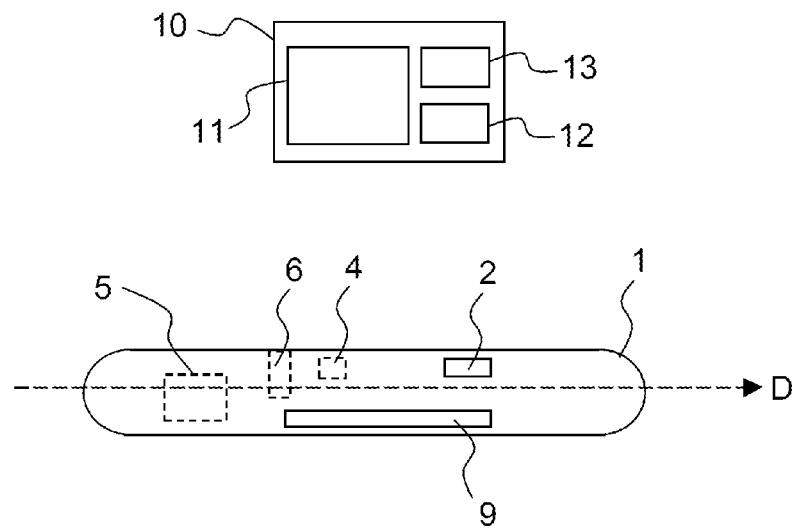
FIG. 1 schematically represents, in side view, a carrier equipped with elements of a detection system according to the invention, the equipment items represented in broken lines are equipment items installed inside the carrier, and remote equipment items are also represented in this figure, FIG. 2 schematically represents, in plan view, a carrier equipped with elements of a detection system according to the invention, FIG. 3 schematically represents a transverse cross section of a carrier equipped with elements of a detection system according to the invention.

FIG. 1 shows elements of a system for detecting underwater objects according to the invention.

The detection system comprises an imaging system comprising a first sonar 2, called mechanically steered sonar, intended to image the water column. This mechanically steered sonar 2 is mounted on a carrier 1. The carrier 1 can be a ship, a towed or autonomous underwater vessel. It is intended to advance in a main direction of advance D considered as being substantially horizontal. The direction D is an oriented direction. The main direction D is the longitudinal direction of the carrier 1 and is oriented toward the front of the carrier. The carrier 1 advantageously comprises stabilizers, such as rudders that are not represented, making it possible to keep the bank angle of the carrier constant (that is to say to limit the roll) and possibly limit the yaw and pitch such that the depth of the sonar or of the sonars embedded on board the carrier is constant with constant depth of the carrier when the direction of advance is substantially horizontal in the terrestrial reference frame.

Figure 2:
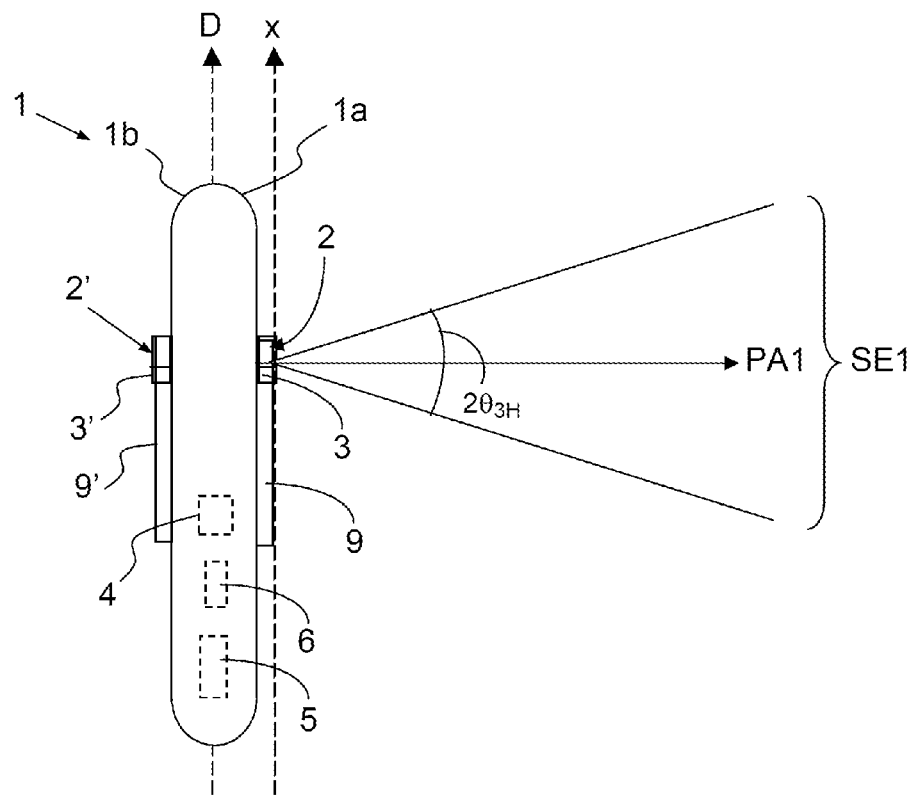

The mechanically steered sonar 2 is a sonar with a single transmit channel and a single reception channel. It is mounted on one of the flanks of the carrier 1. As can be seen in FIG. 2, the detection system advantageously comprises two mechanically steered sonars 2, 2' mounted on the respective flanks 1a, 1b of the carrier 1. Only the sonar 2 will be described in the patent application, the other sonar 2' being configured and arranged in the same way.

The mechanically steered sonar 2 is intended to conduct a sonar acquisition of a first individual sector SE1 by transmitting a single first acoustic pulse and by conducting the acquisition of the first acoustic signals thus obtained. The first individual sector SE1 is the sector at −3 dB in which is emitted the main lobe of an acoustic pulse emitted by the sonar 2. A first oriented pointing direction PA1 is defined, visible in FIG. 2, corresponding to the direction in which the maximum acoustic energy is sent when the sonar transmits a first acoustic pulse. The mechanically steered sonar 2 is mounted on the carrier 1 such that the first pointing direction PA1 is substantially lateral to the carrier 1. In other words, the first pointing direction PA1 extends in a substantially vertical plane forming, in a horizontal plane in the terrestrial reference frame, a non-zero angle with the main direction D. This plane is advantageously substantially at right angles to the main direction D. The mechanically steered sonar 2 is also mounted on the carrier 1 such that the first individual sector SE1 exhibits a wide relative bearing aperture $2\theta_{3H}$ (in the horizontal plane) and a narrow elevation aperture $2\theta_{3V}$ (in the vertical plane), visible in FIG. 3, so as to obtain the desired angular resolution according to the elevation. The narrow elevation aperture makes it possible to limit the effect of reverberation from the surface of the water and locate the objects having neutral buoyancy with a good accuracy. The first pointing direction PA1 divides the first individual sector SE1 into two equal parts in these two planes.

The mechanically steered sonar 2 comprises a mechanical pointing device 3 intended to tilt the first pointing direction PA1 about an axis of rotation x substantially parallel to the main direction D. In other words, the pointing device 3 allows the sonar 1 to perform a vertical scan. This device is, for example, a device that makes it possible to tilt the emission and reception arrays of the sonar about the axis x. In other words, it mechanically tilts the pointing direction about the axis x.

The system according to the invention advantageously comprises a processing unit 5 making it possible to locate and possibly detect, prior to the locating, underwater objects having neutral buoyancy from at least one first acoustic signal.

The mechanically steered sonar 2 is not bulky, and a low electrical energy consumer. Moreover, the first acoustic signals obtained by means of this sonar are easy to process notably to proceed to detect underwater objects, and locate them. It makes it possible, by configuring it and by processing the acoustic signals obtained shrewdly, to locate, accurately and with little complexity, underwater objects detected in the three directions of space over a swath comparable to that of a side-scan sonar.

Advantageously, the system according to the invention comprises a plurality of mechanically steered sonars spaced apart in the main direction and the oriented pointing directions of which are directed toward a same side of the carrier, that is to say on the same side of a vertical plane passing through the main direction D. The directions pointed to by the adjacent sonars at a given instant are offset by an appropriate angle. They are for example offset by half of the angular aperture of the sector to be imaged such that each sonar scans only half of the sector to be imaged or else offset by half of the tilt step. The tilt step and the sector to be imaged are defined subsequently. The processing unit 5 is then configured to locate and possibly detect underwater objects having neutral buoyancy from at least one first acoustic signal from at least one scanning sonar. This configuration makes it possible, for a same spatial resolution, to increase the maximum speed of the carrier, and/or increase the vertical resolution of the moored mine detection system, and/or refine the directionality in the vertical plane in order to improve detection efficiency, particularly in the directions close to the interfaces (surface, bed) and location efficiency in the vertical plane while keeping a scanning speed compatible with a minimum number of target hits (>3), and/or to increase the scanning speed in order to multiply the number of target hits, and/or to increase the width of the vertical sector covered.

The invention relates also to a method for detecting objects in the volume of water, that is to say underwater objects having neutral buoyancy.

This method comprises a scanning step 20 in which the mechanically steered sonar 2 scans, a plurality of times, a sector to be imaged SI that is open in elevation, that is to say in a plane at right angles to the main direction D. This sector to be imaged SI is delimited by a minimum direction $D_{min}$ and a maximum direction $D_{max}$ respectively exhibiting a minimum elevation angle $\theta_{min}$ and a maximum elevation angle $\theta_{max}$ greater than the minimum elevation angle. The elevation angles are defined relative to the horizontal plane P passing through the sonar 2 represented by dotted lines in FIG. 3, the elevation angle of an oriented direction being counted as positive when it is directed to a point situated above the horizontal plane P.

Figure 5:
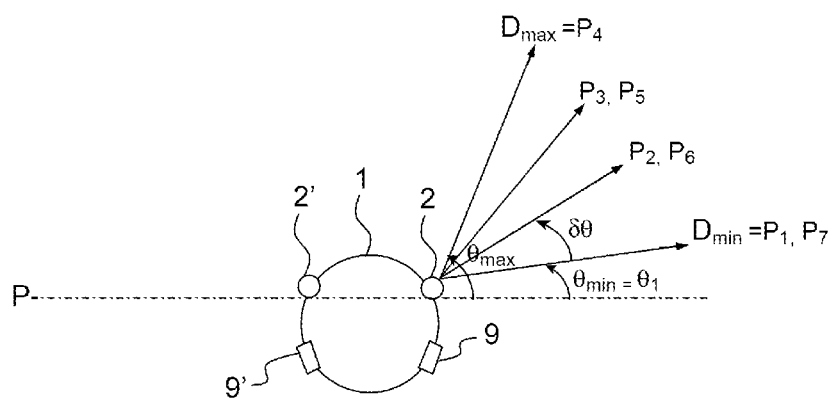
FIG. 5 represents, on the same transverse cross section, successive pointed directions of the scanning step, FIG. 6 schematically represents the limits of a zone of the marine environment imaged by the mechanically steered sonar, FIG. 7 schematically represents potential positions occupied by objects creating first echoes received by the mechanically steered sonar in two imaging steps according to pointed directions exhibiting a same elevation angle, FIG. 8 schematically represents potential positions occupied by the first individual sector in successive imaging steps separated by a scanning period according to pointed directions exhibiting a same elevation angle, FIG. 9 schematically represents an exemplary display according to the invention of the representations of first echoes and of second echoes received by the mechanically steered sonar and respectively by the side-scan sonar.
Figure 4:
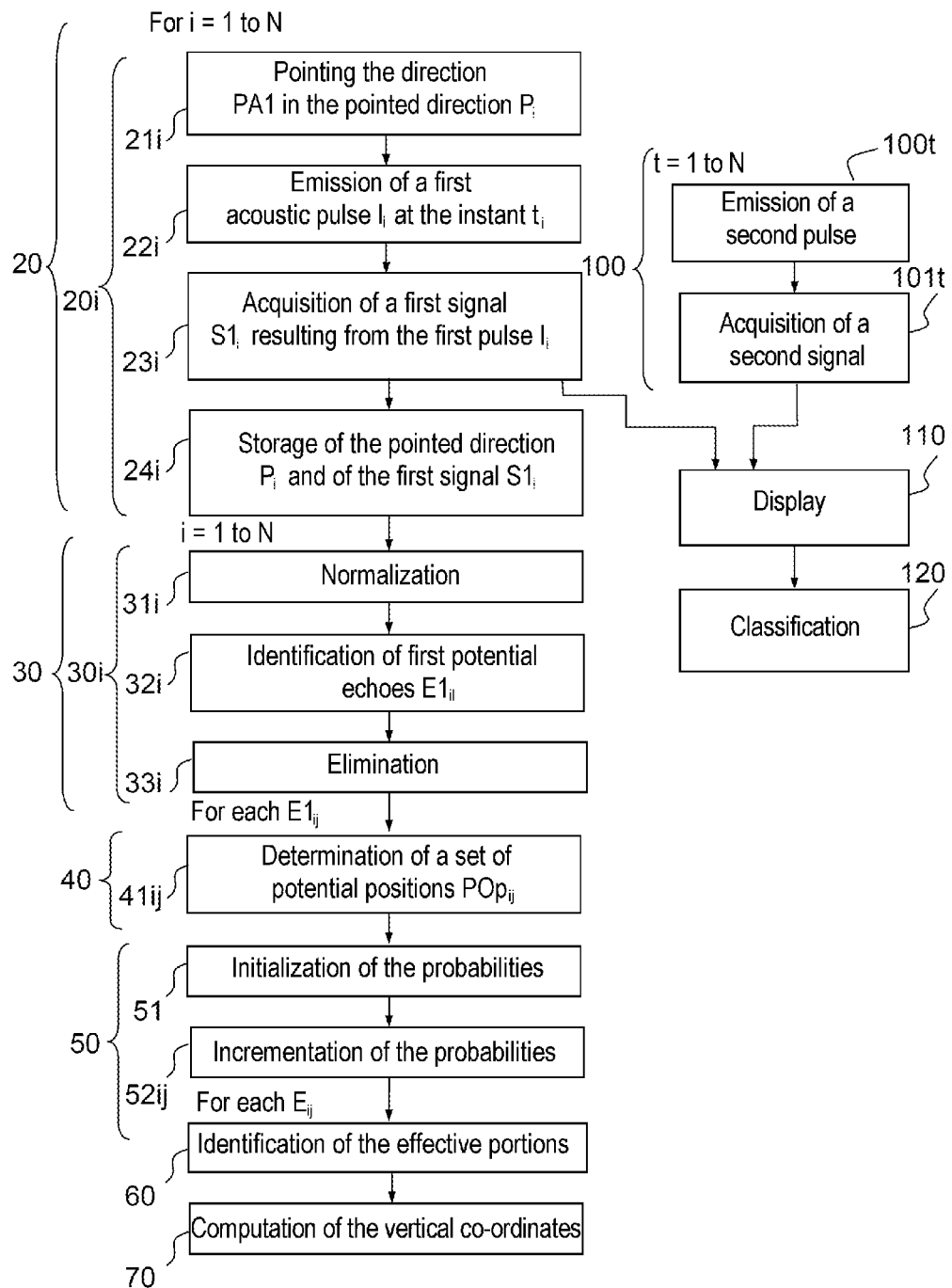
FIG. 4 represents a flow diagram of the method according to the invention.

As can be seen in FIGS. 4 and 5, in the scanning step 20, the mechanically steered sonar 2 performs successive sonar acquisition steps 20$i$, of index i with i=1 to N (where N is the number of sonar acquisition steps performed in the scanning step equal to 7 in FIG. 5), in which the pointing device 3 points the first pointing direction PA1 in respective pointed directions $P_i$ of index or of serial number i. The directions $P_i$ are included in the sector to be imaged SI and have elevation angles of respective indices $\theta_i$ by tilting the first pointing direction PA1 about the axis of rotation x. In each sonar acquisition step 20$i$, the pointing device 3 points, in a step 21$i$, the first pointing direction PA1 in a pointed direction $P_i$, insonifies, in a step 22$i$, the first individual sector SE1, that is to say transmits a first acoustic pulse $I_i$ at a first instant of insonification $t_i$ and acquires 23$_i$ a first acoustic signal s1$_i$ corresponding to an acoustic intensity as a function of time. The method also comprises a step of storage 24$i$, in a memory 4, of the first acoustic signal s1$_i$ and of the insonification instant $t_i$.

By pointing the mechanically steered sonar 2 laterally to the carrier 1 and by having it perform a vertical scan (by rotation of the pointing direction about an axis of rotation substantially parallel to the axis of the underwater vehicle), it is possible to detect underwater objects having neutral buoyancy over a swath comparable to that of a side-scan sonar imaging the seabed that can range from 20 to 300 meters.

The fact that the mechanically steered sonar points laterally makes it possible to obtain images laterally relative to the direction of the carrier. In this way, the detection of objects in the water column such as moored mines can be performed simultaneously with the imaging of the seabed, by a side-scan sonar, directly below the zone imaged by the mechanically steered sonar. It is consequently possible to rapidly image a wide zone, both the seabed and the water column, without having to pass over the same point several times.

The successive pointed directions R are chosen so as to totally insonify the sector to be imaged SI, that is to say such that the first individual sector SE1 covers contiguous successive zones, the set of the contiguous zones forming the sector to be imaged. In other words, the angle θ formed between two consecutive pointed directions is advantageously substantially equal to or less than $2\theta_{3H}$ and preferably less than $2\theta_{3H}/2$.

The scanning is advantageously performed, as represented in FIG. 5, where N=7, by conducting consecutive two-way sweeps of the sector to be imaged SI, that is to say by scanning the sector to be imaged alternately in a first direction then in a second direction opposite to the first direction. Advantageously, the scanning is performed at a constant speed (that is to say that the time to switch from one pointed direction to the next is constant) and with a constant step, called tilt step δθ, between two consecutive a pointed directions.

The scanning in two-way sweeps makes it possible to have a high probability of imaging a fixed object more than once upon the movement of the carrier and also makes it possible to perform a rapid imaging of a zone to be imaged. A scanning period is therefore the time needed to conduct a two-way sweep, that is to say the time needed to scan the sector to be imaged SI once by starting from a pointed direction exhibiting an elevation angle and by returning to a pointed direction exhibiting the same elevation angle. It would be possible, less advantageously, to scan the sector to be imaged only in one direction by starting from the minimum (or maximum) direction, by pointing the first pointing direction in consecutive pointed directions within the sector as far as the maximum (or minimum) direction, by returning to the initial direction and by repeating the scan in the same direction.

The carrier 1 moves throughout the scanning step in relation to the terrestrial reference frame. It follows a substantially rectilinear and preferably uniform trajectory at a substantially constant speed and at substantially constant altitude Hmp in relation to the seabed 7.

Figure 3:
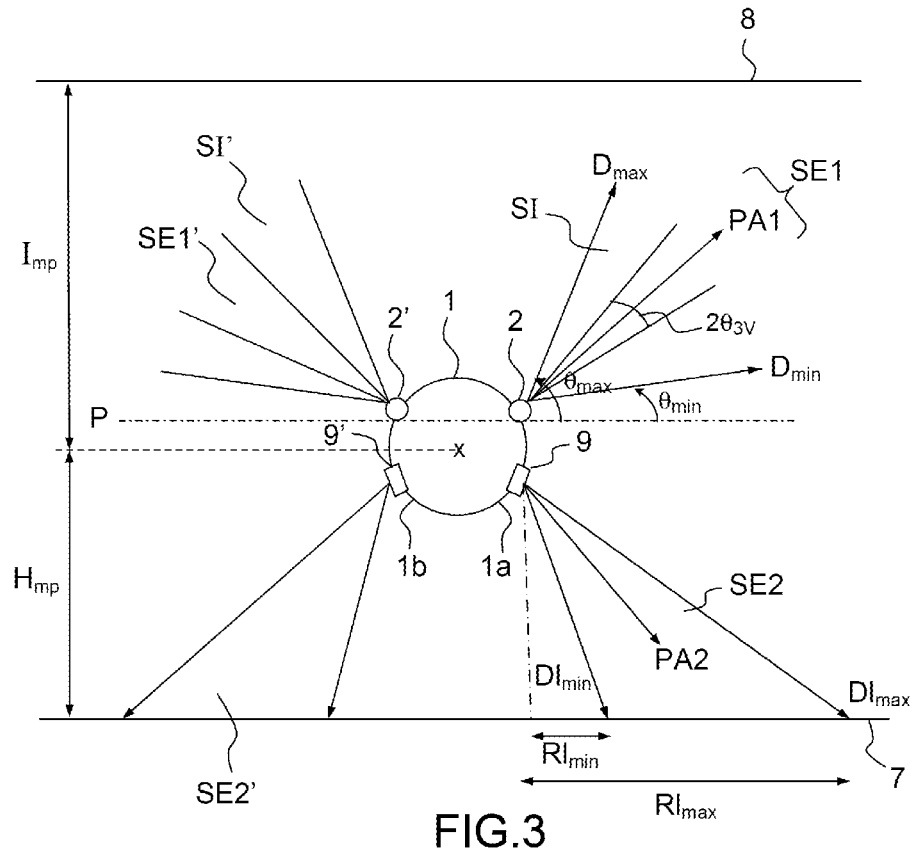
Figure 6:
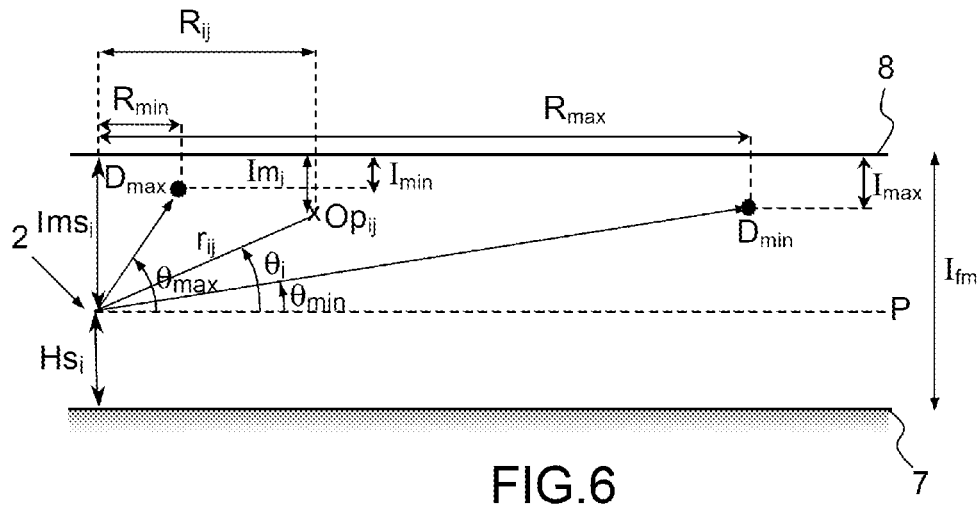

As can be seen in FIG. 6, the minimum $\theta_{min}$ and maximum $\theta_{max}$ elevation angles are defined so as to image a water column extending horizontally and transversally (that is to say at right angles to the main direction D) between a predefined minimum range $R_{min}$ (defined by the direction $D_{max}$) and a predefined maximum range $R_{max}$ (defined by the direction $D_{min}$) and, vertically, between a predefined minimum depth $I_{min}$ and a predefined maximum depth $I_{max}$. The depth of an object is the vertical distance separating this object from the surface level of the water. The minimum elevation angle $\theta_{min}$ and the maximum elevation angle $\theta_{max}$ depend on the depth $Ims_i$ of the mechanically steered sonar 2 at constant altitude $Hs_i$ in relation to the seabed 7, and also on $R_{min}$, $R_{max}$, $I_{min}$ and $I_{max}$. The maximum depth $I_{max}$ is chosen so as to be less than the depth 6 of the seabed and the minimum depth must be greater than 0 to be below the surface of the water 8. The directions $D_{min}$ and $D_{max}$ can exhibit positive or negative elevation angles $\theta_{min}$ and $\theta_{max}$, the condition being that, for the depth of the sonar 2, the volume imaged when the pointing direction points in these directions in the volume defined between $R_{min}$ and $R_{max}$, $I_{min}$ and $I_{max}$ is a volume of water and not the seabed. In other words, between the minimum and maximum range distances and the minimum and maximum depths the sonar 2 images the volume of water in which it is dipped. In the embodiment of FIGS. 3 and 6, the elevation angles are positive, the pointed directions are always pointed upward.

The processing unit 5 is embedded on board the carrier 1. This processing unit 5 can comprise one or more computers or can be a computation function of a computer. It can as a variant be partially remotely sited away from the carrier, for example on a ship, on land or on board an aircraft, and partially on board the carrier. It can also be entirely remotely sited.

The processing unit 5 is advantageously configured so as to calculate the minimum and the maximum $\theta_{min}$, $\theta_{max}$ angles during the mission, for example at regular time intervals as a function of the depth Imp of the carrier 1, of the position of the sonar 2 on the carrier, and possibly as a function of its attitude, notably of its list. The depth of the carrier Imp is advantageously supplied to the processing unit by a positioning unit 6 configured so as to determine the position and possibly the attitude of the carrier 1 at regular time intervals, for example, at the first successive insonification instants and to supply them to the processing unit 5. In other words, the positioning unit 6 is configured to supply the processing unit 5 with the space-time trajectory of the carrier 1 and possibly its attitude as a function of time. It can be an acoustic and/or inertial positioning device or any other type of positioning device. This device is advantageously embedded on board the carrier 1.

The processing unit 5 supplies these angles $\theta_{min}$, $\theta_{max}$ to the scanning sonar 2, possibly together with a scanning speed, an angular tilt step $\delta\theta$ and a scanning mode (two-way or one-way, for example). As a variant, the depth of the carrier 1 is assumed predefined and these data are supplied to the sonar 2 before the mission, notably the angles $\theta_{min}$, $\theta_{max}$ are computed before the mission.

In one embodiment, the method comprises a detection step 30, performed by the processing unit, consisting in detecting first potential echoes having been created by objects of neutral buoyancy floating mid-water by means of first signals. This step comprises unitary detection steps 30$i$ from respective first signals $s1_i$. A unitary detection step 30$_i$ associated with a sonar acquisition step 20$_i$ consists in determining first potential echoes $E1_{ij}$ considered as having been created by potential floating objects $Op_{ij}$ of indices l and j with j=1 to Mi where Mi is the number of potential objects detected for the sonar acquisition step 20$i$, from the first acoustic signal $s1_i$ acquired by the sonar 2 in the sonar acquisition step 20$i$ of the same index. A first potential object $Op_{ij}$ is considered to have created a first echo when the latter satisfies a predefined selection criterion. In other words, a first potential echo is a part of the first acoustic signal satisfying a predetermined selection criterion.

The unitary detection step 30$i$ advantageously comprises an identification step 32$i$ in which there are identified, by a method of thresholding of the contrast of the first signal, the first potential echoes $E1_{il}$ l=1 to L included in the first signal and exhibiting a contrast, that is to say a signal-to-noise ratio above a predetermined contrast threshold where L is the number of echoes exhibiting a contrast above the contrast threshold.

This contrast threshold can be fixed. It can be a function of the time separating the instant of emission of the acoustic pulse and the instant of reception on the first signal, that is to say the function of the distance separating an echo from the sonar.

The contrast threshold can be computed dynamically to obtain a constant false alarm rate, that is to say a constant rate of detections of potential objects which are not real objects relative to the detections of potential objects which are real objects. The detection threshold can, for example, be fixed to obtain on average a constant detection density over the entire swath.

The identification step 32$i$ is possibly preceded by a step of normalization 31$i$ of the intensity of the first signal $s1_i$ as a function of the duration separating the instant of emission of the acoustic pulse and the instant of reception to allow for the application of a constant contrast threshold.

The unitary detection step 30$i$ advantageously comprises an elimination step 33$i$, in which the first potential echoes $E1_{il}$ created by potential objects $Op_{il}$ deriving from the surface reverberation and/or potential objects deriving from the seabed and/or potential objects situated outside the zone of interest included between the minimum and maximum ranges $R_{min}$, $R_{max}$, are eliminated. In this case, the selection criterion is a dual criterion of position and of intensity (or of contrast). First potential echoes $E1_{ij}$ are then obtained.

The elimination step 33$_i$ consists, for example, in eliminating the first potential echoes $E1_{il}$ situated at a distance from the mechanically steered sonar 2 that does not lie within a distance interval. The elimination step uses the elevation angle of the pointed direction $P_i$ in the insonification step 22$i$ and the instant of insonification 22$i$ and the instant of reception of the first associated potential echo $E1_{il}$ as well as the depth of the sonar 2. The distance interval is advantageously the distance interval outside of which the potential objects detected are situated at a depth greater than the maximum depth $I_{max}$ or at a depth less than the minimum depth $I_{min}$ and/or at a horizontal distance from the sonar less than the minimum range $R_{min}$ or greater than the maximum range $R_{max}$. The method according to the invention therefore makes it possible to very simply reject the potential objects deriving from reverberation from the surface or from the bottom when the pointing direction is directed respectively toward the surface or toward the bottom.

On completion of the unitary detection step 30$i$, an uncertainty remains as to the position of the potential objects $Op_{ij}$ because of the relative bearing aperture of the individual sector. It is known how to compute the slant range $r_{ij}$ (that is to say the distance) separating the potential object $Op_{ij}$ and the sonar 2, the horizontal distance $R_{ij}$ separating the object from the sonar (from the elevation angle $\theta_i$ of the pointed direction $P_i$ at the moment of insonification 22$i$, of the slant range $r_{ij}$ and possibly the attitude of the carrier if it is not fixed), as well as its depth $Im_{ij}$ (from the elevation angle $\theta_i$, the pointed direction $P_i$ at the instant $t_i$ of insonification 22$_i$, the depth $Ims_i$ of the carrier at the instant of insonification and possibly from its attitude).

The depth $Im_{ij}$ of the object is given by the following formula:

$$Im_{ij} = Im - r_{ij} \sin(\theta_{ij}) \quad [1]$$

The horizontal distance $R_{ij}$ is given by the following formula:

$$R_{ij} = \sin(\theta_{ij}) * r_{ij} \quad [2]$$

Figure 7:
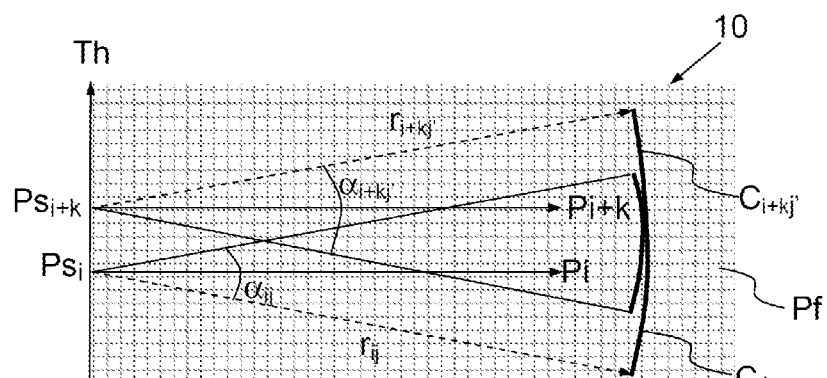

On the other hand, it is not possible to accurately know the position of the potential object in the horizontal plane. This object can occupy a set of potential positions corresponding to a circular arc, the center of which is the position of the sonar 2 at the instant of emission of the acoustic pulse and the radius of which is the slant range $r_{ij}$. That is represented in FIG. 7. This figure shows the trajectory of the sonar 2, the positions $Ps_i$, $Ps_{i+k}$ of the carrier 1 at the first instants of insonification of indices i and i+k which are successive instants of insonification according to the pointed directions exhibiting a same elevation angle and separated by a scanning period. The set of positions potentially occupied by a potential object $O_{pij}$, $O_{pi+kj}$, having generated a first echo deriving from the insonification step 22$i$, respectively 22$i$+k, and being situated at the slant range $r_{ij}$, respectively $r_{i+kj}$, of the carrier is a circular arc $C_{ij}$, respectively $C_{i+kj}$, of radius $r_{ij}$, respectively $r_{i+kj}$, the center of which is the position $Ps_i$, respectively $Ps_{i+k}$ and symmetrical relative to the vertical plane in which the pointed direction Pi, Pi+k is located. In the embodiment of FIG. 7, the angular apertures of these circular arcs $\alpha_{ij}$, and respectively $\alpha_{i+kj}$ equal to $2\theta_{3H}$. It will be seen that the angular apertures can be greater than $2\theta_{3H}$.

Another drawback is that the detections can exhibit a not inconsiderable number of false alarms.

Advantageously, the scanning is performed in such a way as to image more than once a one-off object fixed in the terrestrial reference frame and located at right angles to the direction D, at a horizontal distance from the sonar at least equal to the minimum range $R_{min}$ and less that the maximum range $R_{max}$ of the sonar 2 and between the minimum $I_{min}$ and maximum $I_{max}$ depths, when the carrier advances at a predetermined speed $V_{avg}$ by rectilinear movement. It is stated that the system is configured so as to produce a number of target hits. Thus, a number of first echoes are acquired that originate from the object in the scanning step and these echoes are used to locate neutral buoyancy objects effectively floating mid-water from the first potential echoes created by the potential objects. This feature makes it possible to limit the chances of not detecting a target.

In other words, the scanning speed, the scanning angle $\theta$ and the sector to be imaged are chosen so as to image more than once an object situated in the space defined by $R_{min}$, $R_{max}$, $I_{min}$, $I_{max}$ by means of the first individual sector SE1 at −3 dB of the sonar during the scanning step.

This can be done by configuring the sonar system in such a way that an object fixed in the terrestrial reference frame and located, at right angles to the direction D, at a distance at least equal to a minimum overlap, is located more than once within the individual sector SE1 during an imaging step, when the carrier advances at a speed $V_{avg}$.

Figure 8:
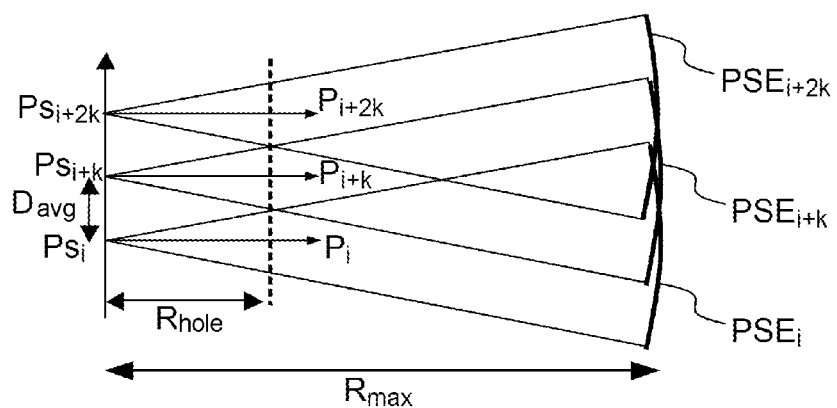

FIG. 8 gives a different representation of the different positions $PSE1_i$, $PSE1_{i+k}$, $PSE1_{i+2k}$ occupied by the first individual sector SE1 as well as the respective positions occupied by the sonar $Ps_i$, $Ps_{i+k}$, $Ps_{i+2k}$ in three insonification steps 22$i$, 22$i$+k, 22$i$+2k, separated in pairs by the scanning period, in which the respective pointed directions $P_i$, $P_{i+k}$, $P_{i+2k}$ exhibit the same elevation angle. In other words, in these insonification steps, the first individual sector SE1 occupies the same position in relation to the carrier, that is to say the same orientation in the vertical plane.

These fixed one-off objects are imaged at least three times within the first individual sector when the scanning sonar scans the first individual sector more than once at constant scanning speed if they are situated at a horizontal distance at right angles to the direction D at least equal to a first threshold distance $R_{hole}$.

$$R_{hole} = \frac{D_{avg}}{\tan\left(\frac{2\theta_{3H}}{2}\right)} \quad [3]$$

in which $2\theta_{3H}$ is the horizontal aperture of −3 dB of the transmit pattern of the scanning sonar 2, and in which $D_{avg}$ is the average distance travelled by the carrier during the scanning time. The value of the average distance is given by the following equation:

$$D_{avg} = V_{avg} * T_{scan} \quad [4]$$

In which $V_{avg}$ is the average speed of the carrier during the scanning step and in which $T_{scan}$ is the scanning time.

It must be noted that the first echoes received by the mechanically steered sonar 2 are not derived solely from the objects situated within the first individual sector at the time when they are imaged, they can also be derived from objects situated in the rest of the main lobe or outside of this sector. The acoustic pulse in effect exhibits a transmit pattern in sin $\theta/\theta$ form exhibiting a maximum at the level of the pointed direction. The sonar can therefore receive echoes from objects situated within secondary lobes of the transmitted acoustic signal. The objects situated close to the sonar, for example, at a distance from the sonar less than $D_{hole}$, will return an echo exhibiting a significant intensity or contrast, which makes it possible to detect them in the individual detection step by thresholding even if they are situated outside of the individual sector at −3 dB. They will therefore also be able to be detected a number of times when the sonar advances.

This means that the second threshold distance $R_{hole}$ can be greater than the minimum range $R_{min}$ for the method according to the invention to work or that the radius of the circular arc retained to represent the set of potential positions can be a circular arc exhibiting an aperture greater than the horizontal aperture at −3 dB (relative bearing aperture SE1) but, for example, an aperture equal to the horizontal aperture at −10 dB or at −20 dB.

Advantageously, the scanning is performed so as to produce at least three target hits. That makes it possible to guarantee a certain positioning accuracy.

The method according to the invention advantageously profits from the plurality of target hits to reduce the false alarm rate and accurately locate, in the three dimensions of space, the potential objects.

To this end, the method advantageously comprises a step of determination of potential positions 40 comprising, for each first potential echo $E1_{ij}$ a step of determination $41_{ij}$ of a set of potential positions $POp_{ij}$ that the potential object which has created the first potential echo is likely to occupy. These potential positions are determined from the position of the sonar 2 at the instant of emission of the acoustic pulse originating from said first potential echo $E1_{ij}$ The position of the sonar 2 is advantageously computed by the processing unit 5 from the position of the sonar in relation to the carrier and from the position of the carrier. As a variant, the positioning unit 6 directly supplies the position of the sonar to the processing unit 5.

These potential positions $POp_{ij}$, can be two-dimensional positions in the horizontal plane. In this case, as explained previously with reference to FIG. 8, the set of potential positions that a potential object $Op_{ij}$ can occupy is the projection, in a horizontal plane, of a circular arc $C_{ij}$, the center of which is the position $Ps_i$, which is symmetrical in relation to the vertical plane in which the pointing direction Pi is located and the radius of which is the slant range $r_{ij}$ separating the potential object from the sonar 2. These circular arcs $C_{ij}$ can exhibit an angular aperture equal to the relative bearing aperture of the first individual sector SE1 or equal to the relative bearing aperture of the first individual sector plus a predetermined tolerance aperture corresponding to a fraction of the aperture of the first individual sector so as to take account of objects detected outside of the first individual sector. As stated previously, the angular aperture of the circular arc can for example be equal to the horizontal aperture at −10 dB or at −20 dB.

The method also comprises an accumulation step 50 in which fixed positions Pf in the terrestrial reference frame are assigned respective probabilities of occupancy corresponding to probabilities of being actually occupied by an object. These probabilities are initialized, for example at 0, in a step 51 at the start of the accumulation step and incremented 52$ij$ each time that said fixed positions are identified as being potential positions in the step of determination of the sets of potential positions 40. The fixed positions Pf assigned probabilities are cells of a grid 10 represented in FIG. 7.

In the case where the potential positions are two-dimensional positions in the horizontal plane, the fixed positions assigned probabilities are cells of a two-dimensional grid, the sides of which are parallel and at right angles to the direction D.

The method comprises a step of identification 60 of effective positions which are positions effectively occupied by an object out of the fixed positions, the effective positions being obtained from fixed positions assigned a probability of occupancy above a predetermined probability threshold. This step makes it possible to select only the objects seen a sufficient number of times. On completion of this step, the non-relevant potential objects (not seen a sufficient number of times by the method) have been eliminated. It has notably been possible to eliminate fish in motion contrary to the moored mines occupying positions that are substantially fixed and other false alarms.

The effective positions correspond to the two-dimensional positions which are assigned the maximum probability in a circle of radius less than a predetermined threshold (local maximum).

In the case of FIG. 7, the fixed positions are all either assigned a probability equal to 1 for the fixed positions (or cells) over which a circular arc extends, or a probability equal to 0 for the fixed positions over which a circular arc does not extend, or a probability equal to 2 only for the fixed position situated at the intersection of the two circular arcs.

The increments can be fixed. As a variant, the increment is all the greater when the contrast of the first echo created by the potential object is great. That makes it possible to grant greater credit to a strong echo, that is to say an echo with a significant contrast.

The step of location of the objects comprises a step of computation 70 of the vertical co-ordinates effectively occupied in the vertical plane from elevation angles of the pointed directions in emissions of the acoustic pulses originating the first potential echoes created by the potential objects occupying potential positions corresponding to the positions assigned probabilities above the probability threshold and from the distances separating the potential objects and the mechanically steered sonar. This value can be obtained from an average or from a median of the elevation angles of the pointed directions in the insonification steps originating first potential echoes considered.

In other words, the step of location of the objects comprises a step of computation 70 of the vertical co-ordinates effectively occupied in the vertical plane from the depths of the potential objects occupying potential positions corresponding to the positions assigned probabilities above the probability threshold and from the distances separating the potential objects and the sonar. The depth of a potential object is defined by the formula [1]. This method described previously makes it possible to locate the object with a good accuracy in the three dimensions of space. The resolution in the vertical direction is defined by the elevation aperture of the first individual sector.

As a variant, the fixed positions are three-dimensional geographic positions. They are for example cells of a three-dimensional grid, the height of which corresponds to the aperture of the first individual sector plus a possible predefined elevation tolerance (variable as a function of the horizontal distance separating a cell from the sonar 2). The method therefore makes it possible to obtain a vertical resolution corresponding to the elevation aperture of the first individual sector.

In this case, the step of location of the objects having neutral buoyancy corresponds to the step of selection 60 of the effective positions.

Advantageously, the system according to the invention comprises, as can be seen in FIG. 1, at least one side-scan sonar 9 intended to image the seabed 7 in a second oriented pointing direction PA2 visible in FIG. 3, in a second individual sector SE2 exhibiting a wide relative bearing aperture and a narrow elevation aperture, the side-scan sonar 9 forming a plurality of reception channels in relative bearing terms and being mounted on the carrier 1 such that the second pointing direction PA2 is oriented substantially laterally to the carrier 1, preferably substantially at right angles to the main direction D, on the same side of the carrier 1 in relation to the vertical plane passing through the main direction D as the first pointing direction PA1. The sonar can be a synthetic aperture side-scan sonar.

In a seabed imaging step 100 concurrent with the scanning step 20, the side-scan sonar transmits, in steps 100*t* (with t=1 to N for example), second successive acoustic pulses at second successive instants of insonification and acquires, in steps 101*t*, second successive acoustic signals si2 resulting from the respective second acoustic pulses. Advantageously, the second successive instants of insonification are the same instants as the first successive instants of insonification. In other words, the sonars are synchronized. That makes it possible to avoid having the sonars interfere with each other. Consequently, the sonars have the same pulse repetition rate and therefore the same range. Advantageously, the emission frequency bands of the two sonars are not superposed.

Figure 9:
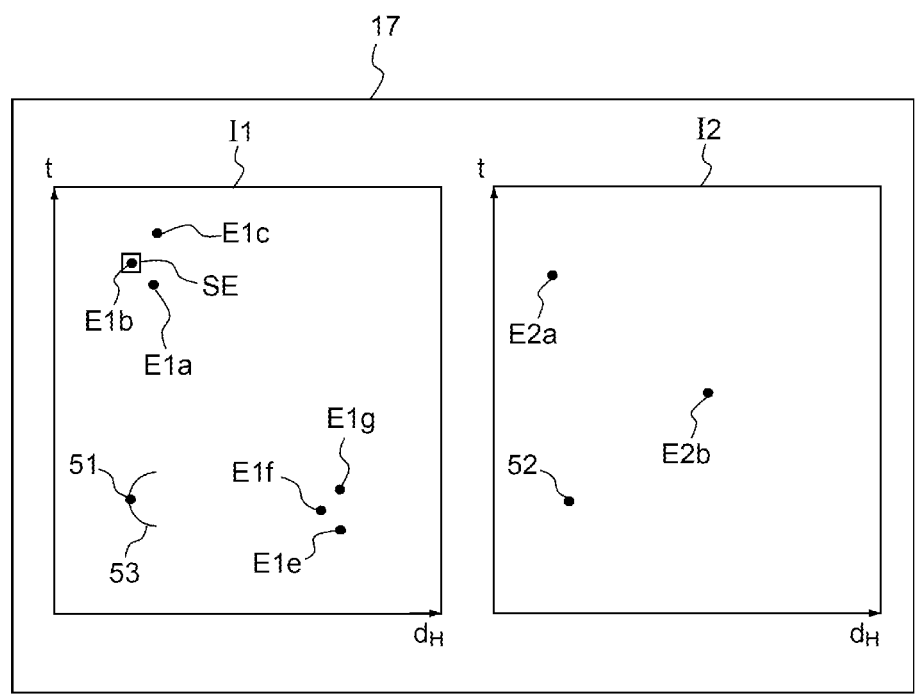

The system further comprises a human-machine interface 10, arranged, for example, on a surface ship, comprising a display device 11 intended to display, in a step 110, simultaneously, as represented in FIG. 9, a first sonar image I1 representing first acoustic signals and a second sonar image I2 representing second acoustic signals acquired during a same period of acquisition by the mechanically steered sonar and respectively by the side-scan sonar. In other words, the display device comprises means for generating the sonar images from the first and second acoustic signals. The echoes originating from objects are visible on the images and represent significant intensities.

The human-machine interface is configured such that, when the first and second images are displayed simultaneously, an operator can, when they visually identify, on the first image, a first echo created by a submerged object having neutral buoyancy, visually identify instantaneously, on the second image, if a second echo has been reflected by an object placed on the seabed substantially directly below the submerged object.

In other words, the human-machine interface is configured such that an operator can visually simultaneously locate, instantaneously on the two images, first and second echoes situated substantially directly above and below one another. In other words, the human-machine interface is configured such that an operator can simultaneously visually locate first echoes and second echoes from substantially a same geographic co-ordinate, in a terrestrial reference frame, on the two images. This feature makes it possible to eliminate false alarms notably by allowing an operator to distinguish first echoes from free floating objects such as fish from moored mines linked to an object placed on the seabed 7. In the embodiment of FIG. 9, the first image I1 and the second image I2 are displayed simultaneously. These respective images I1, I2 represent the intensities of the echoes included in the first and second signals. The display device is configured such that the first image and the second image displayed are of substantially identical sizes and that a first echo and a second echo from objects situated at a same distance, that is to say slant range, from the mechanically steered sonar and respectively from the side-scan sonar are represented substantially at a same abscissa and that a first echo and a second echo generated following a first and respectively a second simultaneous pulse are situated at a same ordinate on the two images I1 and I2. The two images are said to be geographically synchronized. As a variant, the first images can be superposed while being distinguished by two symbologies. The first and second echoes can, for example, be represented by two different colors.

Advantageously, in the embodiment of FIG. 9, the first image I1 and the second image I2 comprise first echoes E1*a*, E1*b*, E1*c*, E1*e*, E1*f*, E1*g* and second echoes E2*a*, E2*b* that are very intense according to a same system of co-ordinates. FIG. 9 does not show the echoes originating from objects situated outside the respective observation zones of the two sonars, for example, from reverberation from the surface of the water. These echoes are advantageously attenuated or eliminated before the display step 110. The background noise is represented in white and a bright echo on a sonar image is here represented in black. In this figure, the display mode is an instant mode t of emission of the acoustic pulse originating the echo included in the acoustic signal (on ordinate)/distance d (on abscissa) separating the object having created the echo from a predetermined point that is fixed in relation to the sonars. The fixed point is, for example, the position of the sonars which are substantially in line with one another. This distance is computed by the processing unit. The instant of emission of the acoustic pulse is representative of the position of the object according to the main direction D with uncertainties substantially corresponding to the relative bearing apertures of the individual sectors at −3 dB of the two sonars.

In other words, the first image I1 represents the intensities of the first acoustic signals as a function of the first instants of emission of the first acoustic pulses, on ordinate, and, on abscissa, as a function of the distance separating an object having created an echo included in the signal from the mechanically steered sonar, that is to say as a function of the acquisition instant. The second image represents the intensities of the second acoustic signals as a function of the second instants of emission of the second acoustic pulses, that is to say as a function of the acquisition instant on ordinate, and, on abscissa, as a function of the distance separating an object having created an echo included in the signal from the side-scan sonar. The display device is configured such that the echoes from identical instants of emission are displayed at the same ordinate on the window or the display screen 17 and the distance scale and the origin of the range of distances displayed are the same for the two images.

On the first image I1, two triplets of first successive echoes E1*a*, E1*b*, E1*c* and successive echoes E1*e*, E1*f*, E1*g* are distinguished. This is due to the fact that the mechanically steered sonar 2 is configured to produce at least three target hits. A floating object will therefore be detected three times by the sonar in the scanning step while the carrier is moving in the direction D during three imaging steps in which the pointed directions exhibit a same elevation angle (that is to say separated in time by the scanning period). The slant range separating the echo from the sonar 2 increases between the echo E1*a* and the echo E1*b* and decreases between the echo E1*b* and the echo E1*c*. This is due to the fact that, in its movement, the carrier approaches the fixed floating object and then moves away therefrom. The same applies for the triplet of points E1*d*, E1*f*, E1*g*.

In the second image, a second echo E2*a* is from a second emission simultaneous with the first emission from which the echo E1*b* is derived because they are situated substantially at the same ordinate. Moreover, these echoes, being situated substantially at the same abscissa, are situated at the same distance from the two sonars 2, 9. There are therefore high probabilities that the object which has created the echoes E1*a*, E1*b* and E1*c* is a moored mine even though there are no second echoes visible on the second image I2 in the vicinity of the echoes E1*e*, E1*f*, E1*g*. These first echoes are probably from a free floating object. The same applies for the echo E2b which, not having any corresponding first echo in its vicinity, is probably from an object placed on the seabed.

The display as described previously therefore allows an operator to classify the echoes or to confirm detections of effective objects obtained by the processing unit. Advantageously, the human-machine interface 10 comprises a classification unit 12 allowing an operator to classify, in a step 120, first echoes visible on the first image (in the case of a manual detection), or first effective echoes identified by the processing unit 5, as being effectively from a submerged object having neutral buoyancy (in the case of an automatic detection) in a first class taken from a plurality of classes comprising a moored mine class and a free floating object class.

The processing unit 5 can also be configured to locate only the first echoes classified in the moored mines class by the operator. The locating is then performed simply by means of the pointed direction for the acquisition of the echo concerned and of the instant of reception of this echo.

Advantageously, the human-machine interface comprises tracking means 13 allowing an operator to simultaneously move a first cursor 51 and a second cursor 52. These cursors are displayed by the display device. The first cursor 51 is displayed on the first image I1. The second cursor 52 is displayed on the second image I2. In other words, the cursors 51, 52 are superimposed on the respective images I1 and I2. The display device is configured such that the two cursors occupy, on the two images, respective positions corresponding to a same geographic position in a terrestrial reference frame, called pointed position. Otherwise, the co-ordinates occupied by the two cursors on the two images correspond to identical geographic positions in the terrestrial reference frame. With this cursor, it is not essential to provide images of the same size in FIG. 9. The tracking means comprise, for example, a mouse, a set of keys allowing an operator to direct the cursor in different directions, or even a touch zone.

Advantageously, as can be seen in FIG. 9, the cursor 51 displayed on the first image I1 is provided with a curve 53 computed dynamically by the processing unit or the display device. The curve 53 depends on the position pointed to by the cursor. It extends around the position pointed to by the cursor and is configured so as to represent a set of possible positions, on the first image, of echoes created by an object having created an echo represented at the position pointed to by the cursor on the image. Thus, if the cursor is placed at E1b, the associated curve will pass through the points E1c and E1a. This cursor makes it possible to visualize the expected position of successive echoes of an immobile object in the volume of water and thus assists the operator in identifying the possible echoes from contacts of interest. This curve is computed approximately as follows:

When the cursor points to a position having the co-ordinates $t_i$ and $r_i$ where $t_i$ corresponds to an instant of insonification $t_i$ originating an echo and $r_i$ represents an slant range between an object originating the echo and the volume scanning sonar, the position $r_{i+k}$ of the curve on the distance axis situated on the time axis at the instant $t_{i+k}$ is thus computed:

$$r_{i+k} = \sqrt{r_i^2 + (D_{avg} \times k)^2}$$

$r_{i-k} = r_{i+k}$. The curve 53 is preferably centered around the position i along the time axis t.

Advantageously, as represented in FIG. 9, the display device is configured to display superimposed on the first image and/or the second image, symbols SE at effective positions considered as being effectively occupied by the echoes detected by the processing unit 5. That allows an operator to concentrate on the zones where first effective echoes have already been detected so as to speed up and improve the relevance of the classification. In FIG. 9, a symbol SE corresponding to the effective position identified by the processing unit from the three first echoes E1a, E1b, E1c is displayed only on the first image. The symbol SE is a square in the nonlimiting example of FIG. 9.

Advantageously, as represented in FIG. 3, the side-scan sonar is configured so as to image the seabed 7 in a zone of observation delimited by a minimum observation range $RI_{min}$ and a maximum observation range $RI_{max}$ defined by the respective directions $DI_{mm}$ and $DI_{max}$ delimiting the second individual sector SE2 corresponding to the horizontal distances at right angles to the direction D close to the height of water between the bottom and the side-scan sonar and respectively beyond which the echo becomes too weak.

Advantageously, the minimum and maximum observation ranges $DI_{min}$ and $DI_{max}$ are substantially equal to the minimum and maximum ranges $R_{min}$ and $R_{max}$ of the mechanically steered sonar 2. This configuration makes it possible to carry out the search for moored mines and mines placed on the seabed simultaneously over a same sweep and in a same zone which makes it possible to optimize the trajectory of the carrier and therefore the time taken to inspect a wider zone to be inspected.

The mechanical scanning and side-scan sonars operate at frequencies ranging from several tens to several hundreds of kHz to exhibit an angular resolution compatible with the size of the mines. Advantageously, the first and second acoustic pulses exhibit a bandwidth of at least equal to 50 kHz. This feature makes it possible to limit the echoes deriving from the reverberation from the surface of the water and increase the contrast of the objects to be detected.

In the embodiment of the figures, the system according to the invention comprises two side-scan sonars and two mechanically steered sonars arranged on the two flanks of the carrier, that is to say on either side of the direction D, and configured so as to image the seabed and the marine environment laterally to the carrier on both sides of a vertical plane passing through the direction D symmetrically in relation to this plane as represented in FIG. 3 which shows the other first and second individual sectors SE1', SE2' transmitted by the other scanning 2' and lateral 9' sonars symmetrical to the scanning sonar 2 and respectively to the side-scan sonar 9 in relation to the vertical plane passing through D. A different number of side-scan sonars and mechanically steered sonars can be envisaged.

The invention claimed is:
1. An imaging system comprising:
an assembly comprising at least one mechanically steered sonar mounted on a carrier, such that a pointing direction of the at least one mechanically steered sonar is substantially lateral to a main direction of the carrier, the main direction of the carrier being a longitudinal direction of the carrier along which the carrier is intended to advance, and such that the at least one mechanically steered sonar is configured to conduct sonar acquisition of an individual sector having a first bearing aperture and a first elevation aperture, the first elevation aperture being narrower than the first bearing aperture, wherein
the at least one mechanically steered sonar comprising:
a mechanical pointing device configured to tilt the pointing direction of the at least one mechanically steered sonar about an axis of rotation, the axis of rotation being substantially parallel to the main direction of the carrier,
a single emission channel to emit acoustic pulses in the pointing direction of the at least one mechanically steered sonar, and
a single reception channel to acquire acoustic signals resulting from some of the acoustic pulses.

2. The imaging system of claim 1, further comprising a processing unit configured to locate underwater objects having neutral buoyancy from at least one of the acoustic signals.

3. The imaging system of claim 1, wherein
the at least one mechanically steered sonar of the assembly comprising a plurality of mechanically steered sonars, and
the plurality of mechanically steered sonars are spaced apart in the main direction of the carrier and are mounted on the carrier such that the pointing direction of each mechanically steered sonar of the plurality of mechanically steered sonars of the assembly is directed toward a same side of a vertical plane passing through the main direction of the carrier.

4. The imaging system of claim 1, further comprising:
at least one side-scan sonar to image a seabed in a pointing direction of the side-scan sonar in an individual sector, the individual sector including a second bearing aperture and a second elevation aperture, the second elevation aperture being narrower than the second bearing aperture, the at least one side-scan sonar comprising a plurality of relative bearing reception channels mounted on the carrier such that the pointing direction of the side-scan sonar is oriented substantially laterally to the main direction of the carrier on a same side of a vertical plane passing through the main direction of the carrier as the pointing direction of the at least one mechanically steered sonar and as the pointing direction of the side-scan sonar, and
a human-machine interface comprising a display device to simultaneously display a first sonar image, representing the acoustic signals, and a second sonar image, representing other acoustic signals acquired by the at least one side-scan sonar during a same period of acquisition as the acoustic signals, to enable visual identification, on the first sonar image of a first echo generated by a submerged object having neutral buoyancy, and on the second sonar image, a second echo, generated by an object placed on the seabed substantially directly below the submerged object.

5. The imaging system of claim 4, wherein the display device is configured such that the first sonar image and the second sonar image displayed have substantially identical sizes and such that a first echo included in the first sonar image and a second echo included in the second sonar image reflected by respective objects situated at a same distance from the at least one mechanically steered sonar and respectively from the side-scan sonar and resulting from acoustic pulses emitted simultaneously by the at least one mechanically steered sonar and by the at least one side sonar are represented substantially at a same abscissa and at a same ordinate on the first sonar image and on the second sonar image.

6. The imaging system of claim 4, wherein the human-machine interface comprises a tracker allowing an operator to simultaneously move two cursors displayed by the display device, one on the first sonar image and the other on the second sonar image, the display device being configured such that the two cursors occupy, on the first and the second sonar image, positions corresponding to a same geographic position in a terrestrial reference frame.

7. The imaging system of claim 6, wherein the cursor displayed on the first sonar image is provided with a curve representing a set of the possible positions on the first sonar image of echoes originating from an object having created an echo represented at the position pointed to by the cursor.

8. The imaging system of claim 4, wherein the first sonar image and the second sonar image echoes in an instant mode of emission of acoustic pulse originating the acoustic signals and respectively the other acoustic signals/distance separating a fixed point in the horizontal plane, from objects originating the echoes, and being included in said acoustic signals and respectively other acoustic signals.

9. The imaging system of claim 4, comprising a processing unit configured to identify a first echo originating from a submerged object having neutral buoyancy using at least one of the acoustic signals, the display device being configured so as to display, superimposed with the first sonar image and/or the second sonar image, symbols at positions occupied by the submerged object.

10. The imaging system of claim 4, wherein said human-machine interface comprises a classification unit configured so as to allow an operator to classify first echoes visible on the first sonar image or symbols visible on the first sonar image and representative of echoes detected by a processing unit in classes comprising a moored mine class and a free floating object class.

11. The imaging system as claimed in claim 1, said system being configured to realize a plurality of scanning steps while the carrier advances along the main direction, each scanning step comprising:
pointing the pointing direction, substantially lateral to the main direction, in successive elementary directions included in a sector to be imaged, via the at least one mechanical pointing device,
emitting an acoustic pulse in each of the elementary directions via the single emission channel; and
acquiring an acoustic signal, resulting from the acoustic pulse, via the single reception channel.

12. The imaging system of claim 11, wherein the scanning step further comprises acquiring a plurality of acoustic signals generated by an object and resulting from a plurality of the acoustic pulses, the object being fixed in the terrestrial reference frame and located at a depth lying between a predetermined minimum depth and a predetermined maximum depth, and located at right angles to the main direction D in a horizontal plane at a distance from the at least one mechanically steered sonar greater than a predetermined minimum range and less than a predetermined maximum range.

13. The imaging system of claim 11, wherein said system is configured to:
detect echoes created by submerged objects having neutral buoyancy via first signals, comprising verifying if the acoustic signal satisfies a predetermined selection criterion; and
locate submerged objects having neutral buoyancy from the first acoustic signals acquired in the scanning step and from detected echoes.

14. The imaging system according to claim 1, further comprising the carrier.

15. A imaging method comprising a plurality of scanning steps while a carrier advances along a main direction, the main direction of the carrier being a longitudinal direction of the carrier, each scanning step comprising:

pointing a pointing direction, substantially lateral to the main direction, in successive elementary directions included in a sector to be imaged;

emitting an acoustic pulse in each of the elementary directions; and acquiring an acoustic signal resulting from the acoustic pulse, wherein the pointing direction being tilted about an axis of rotation, the axis of rotation being substantially parallel to the main direction of the carrier between two successive elementary directions.

16. The method of claim 15, further comprising:

detecting echoes created by submerged objects having neutral buoyancy using first signals; and verifying if the acoustic signal satisfies a predetermined selection criterion.

17. The method of claim 16, further comprising thresholding contrasts of the acoustic signal.

18. The method of claim 16, wherein the scanning step comprises acquiring a plurality of acoustic signals generated by an object and resulting from a plurality of the acoustic pulses, the object being fixed in the terrestrial reference frame and located at a depth lying between a predetermined minimum depth and a predetermined maximum depth, and located at right angles to the main direction D in a horizontal plane at a distance from a mechanically steered sonar greater than a predetermined minimum range and less than a predetermined maximum range.

19. The method of claim 18, comprising a step of locating submerged objects having neutral buoyancy, comprising:

determining potential positions of the potential floating objects comprising, for each first acoustic signal verifying the selection criteria, a step of determining a set of potential positions using the position of the mechanically steered sonar at the first instant of emission of the acoustic pulse originating the acoustic signal verifying the selection criterion;

assigning probabilities of occupancy to different potential positions fixed in the terrestrial reference frame, said respective probabilities of occupancy being initialized at the start of an accumulation step and incremented each time the respective fixed positions are determined as being potential positions in the step of determination of potential positions; and identifying positions occupied by submerged objects having neutral buoyancy from potential fixed positions assigned a probability of occupancy above a predetermined threshold.

20. The method of claim 19, wherein the set of potential positions of a potential object is a circular arc of radius equal to the distance separating the potential object from the mechanically steered sonar computed from the difference between the first instant of emission and the instant of reception of the first potential echo created by the potential object, the center of which is the position of the sonar at the first instant of emission and the aperture of which is equal to the aperture of the first individual sector, the first individual sector corresponding to the sector in which is transmitted the portion of the main lobe of the first acoustic pulse attenuated to the maximum of 3 dB, or equal to the aperture of the first individual sector plus a predetermined tolerance aperture.

21. The method of claim 15, further comprising:

imaging the seabed with a side-scan sonar comprising pointing a pointing direction of the side-scan sonar oriented substantially laterally to the main direction on a same side of a vertical plane passing through the main direction, and being comprised in an individual sector including a second bearing aperture and a second elevation aperture, the second elevation aperture being narrower than the second bearing aperture, the side-scan sonar comprising a plurality of bearing reception channels; and simultaneously displaying a first sonar image, representing the acoustic signals, and a second sonar image, representing other acoustic signals acquired by the side-scan sonar during a same period of acquisition as the acoustic signals, to enable visual identification, on the first sonar image a first echo generated by a submerged object having neutral buoyancy, and, on the second sonar image, a second echo, generated by an object placed on the seabed substantially directly below the submerged object.

22. The method of claim 21, further comprising classifying echoes visible on the first sonar image or symbols, visible on the first sonar image and representative of echoes detected by a processing unit, in classes comprising a moored mine class and a free floating object class.

* * * * *

UNITED STATES PATENT AND TRADEMARK OFFICE
CERTIFICATE OF CORRECTION

PATENT NO. : 10,353,059 B2
APPLICATION NO. : 15/021636
DATED : July 16, 2019
INVENTOR(S) : Nicolas Mandelert et al.

Page 1 of 1

It is certified that error appears in the above-identified patent and that said Letters Patent is hereby corrected as shown below:

In the Claims

Claim 10, Column 20, Line 25, "to classify first echoes visible" should be -- to classify echoes visible --.

Signed and Sealed this
First Day of October, 2019

Andrei Iancu
*Director of the United States Patent and Trademark Office*